United States Patent
Kusunoki (10) Patent No.: US 7,661,299 B2
(45) Date of Patent: Feb. 16, 2010

(54) WHEEL STATE MONITORING SYSTEM AND WHEEL STATE DETECTING APPARATUS

(75) Inventor: Hideki Kusunoki, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/020,182

(22) Filed: Jan. 25, 2008

(65) Prior Publication Data

US 2008/0178667 A1    Jul. 31, 2008

(30) Foreign Application Priority Data

Jan. 30, 2007    (JP) .............................. 2007-018821

(51) Int. Cl.
*G01M 17/02*    (2006.01)
(52) U.S. Cl. ........................ 73/146; 340/442
(58) Field of Classification Search ........ 73/146–146.8; 340/442–447
See application file for complete search history.

(56) References Cited

U.S. PATENT DOCUMENTS

| 5,880,363 | A | 3/1999 | Meyer et al. | |
| 6,915,229 | B2* | 7/2005 | Taguchi et al. | 702/138 |
| 7,181,189 | B2* | 2/2007 | Hotta et al. | 455/343.3 |
| 7,236,892 | B2* | 6/2007 | Ogawa | 702/35 |
| 7,248,953 | B2* | 7/2007 | Ogawa | 701/29 |
| 7,271,710 | B2* | 9/2007 | Saitou et al. | 340/447 |
| 7,348,879 | B2* | 3/2008 | Nakatani et al. | 340/442 |
| 7,392,695 | B2* | 7/2008 | Ogawa | 73/146 |
| 7,394,357 | B2* | 7/2008 | Kurata | 340/447 |
| 7,427,915 | B2* | 9/2008 | Ogawa et al. | 340/442 |
| 7,482,913 | B2* | 1/2009 | Kusunoki et al. | 340/442 |
| 2007/0186634 | A1 | 8/2007 | Burghardt et al. | |

FOREIGN PATENT DOCUMENTS

| DE | 196 32 150 A1 | 2/1998 |
| DE | 103 60 122 A1 | 7/2005 |
| JP | 2003-16565 | 1/2003 |
| JP | 2003-267011 | 9/2003 |
| JP | 2004-362536 | 12/2004 |
| JP | 2005-178634 | 7/2005 |
| JP | 2005-309958 | 11/2005 |

* cited by examiner

*Primary Examiner*—Andre J Allen
*Assistant Examiner*—Jermaine Jenkins
(74) *Attorney, Agent, or Firm*—Oblon, Spivak, McClelland, Maier & Neustadt, L.L.P.

(57) ABSTRACT

A tire pressure monitoring system, that includes a plurality of the wheel state detection unit, provided at wheel of a vehicle, and that transmits detected wheel state information. A request signal transmitter transmits a request signal to request transmission of the detected wheel state information. When each wheel state detection unit receives the request signal, it transmits the detected wheel state together with the indication information indicating that the wheel state is detected in response to the transmission request signal. The ECU sets a determination threshold value for triggering an alert regarding tire pressure based on the detected wheel state information transmitted from the plurality of wheel state detection units.

16 Claims, 6 Drawing Sheets

WHEEL STATE MONITORING SYSTEM AND WHEEL STATE DETECTING APPARATUS

INCORPORATION BY REFERENCE

This disclosure of Japanese Patent Application No. 2007-018821, filed on Jan. 30, 2007, including the specification, drawings, and abstract is incorporated by reference in its entirety.

BACKGROUND OF THE INVENTION

1. Field of the Invention

The present invention relates to an apparatus and system for obtaining information related to wheel state for a vehicle.

2. Description of the Related Art

Recently, for obtaining safer travel of vehicle, there are developing a tire pressure monitoring system (TPMS) through which the information of tire pressure, temperature, and the like is transmitted wirelessly to vehicle body to inform to a driver. In such tire pressure monitoring systems, a wheel state detection unit for detecting the wheel state, such as a tire pressure and the like, is mounted in each wheel. The information monitored with the wheel state detection unit is transmitted wirelessly to the vehicle body.

With respect to this kind of monitoring system, Japanese patent Laid-open publication No. 2003-267011 describes a tire pressure alarm device that determines the tire pressure state based on a comparison between the monitored tire pressure and a threshold tire pressure, and alarms to a driver. In the technology described in the Japanese Patent Application Publication No. JP-A-2003-267011, it the tire specification changes, the tire pressure is appropriately adjusted to according to the new tire specification and the adjusted tire pressure is stored as the proper tire pressure, and a new threshold value for determining whether the tire is properly inflated is set based on the stored tire pressure.

In a tire pressure monitoring system, a wheel-state detecting unit is provided with a valve stem and is mounted in a wheel by fixing the valve stem to a wheel rim. In JP-A-2003-267011, the threshold tire pressure is set while the vehicle is stopped. However, a receiver on the vehicle body may have difficulty receiving the air pressure information because the signal strength is less than optimal due to the orientation of the wheel when the vehicle is stopped. In this case, even if the tire specification changes, the information of air pressure cannot be received while the vehicle is stopped. The threshold tire pressure cannot be changed, so that it is disadvantageous. Additionally, when wheels rotate to increase the signal strength improve the electromagnetic wave environment, the receiver on the vehicle body is able to receive the air pressure information the rotating wheels. However, in this case, it is possible that the air pressure information obtained is not accurate because the temperature inside air chamber of the tire changes.

SUMMARY OF THE INVENTION

Accordingly, the present invention provides a technology for transmitting and receiving properly wheel state information for a vehicle.

The wheel state monitoring system in accordance with the present invention comprises a plurality of wheel state detection units, each mounted in a corresponding wheel, and each transmits the wheel state information for the corresponding wheel; a transmitter, mounted on a vehicle body, that transmits a request signal for the wheel state information; and a receiver, mounted on the vehicle body, that receives the wheel state information transmitted from each the wheel state detection unit. When each wheel state detection unit receives the request signal, each wheel state detection unit transmits the wheel state information which includes the wheel sate and indication information which indicates that the wheel state is detected in response to the request signal. Moreover, as for the wheel state when receiving the request signal, it may the wheel state detected immediately before receiving or after receiving.

According to the first aspect of the present invention, even if each wheel state detection unit also transmits the wheel state which is detected sometime, because the wheel state detection unit transmits the wheel state with indication information which indicates that the wheel state is detected in response to the transmission request signal to the vehicle body, where the transmitted wheel state information can be distinguished from wheel state information which is not detected in response to the transmission request signal, referring to the indication information. For example, wheel state information that is transmitted by the wheel state detection unit at specified intervals may be distinguished from wheel state information that is transmitted in response to a transmission request signal from the vehicle body, based on the indication information. As a result, the wheel state information including the indication information can be extracted and used for a special usage.

The vehicle body may be provided with a setting unit, provided on the vehicle body, that sets a threshold value used for triggering an alert regarding a tire pressure based on the wheel state information transmitted from the wheel state detection unit. The wheel state information transmitted in response to the transmission request signal may be used to properly set the determination threshold value.

The wheel state detection unit may store the wheel state information generated in response to the transmission request signal in a memory, until the wheel state detection unit receives a confirmation signal from the transmitter mounted on the vehicle body that the wheel state information has been received. Accordingly, on the vehicle body, for example, before the setting of the determination threshold value is completed, the wheel state information from the memory is not deleted, and if the wheel state information is not received on the vehicle body, the wheel state information remains stored in the memory until it can be retransmitted.

The transmission request signal is sent from the transmitter in response to a driver input, and the setting unit sets the threshold value when the wheel state satisfies a predetermined condition. For example, when the information of tire pressure and the like included in the wheel state information is not normal, the setting unit does not set the threshold value. As a result, it is possible to avoid setting the threshold value in accordance with the wheel abnormal state.

The transmission request signal is sent from the transmitter in response a driver input made when the wheel state satisfies a determined condition. For example, the transmission request signal may be sent when the vehicle is stopped.

A second aspect of the present invention is to provide a wheel state detection unit. The wheel state detection unit comprises a detector that detects a wheel state, a receiver that receives a transmission request signal from a vehicle body side, a memory that stores the wheel state detected by the detector when the receiver receives the transmission request signal, with the indication information which indicates that the wheel state is detected in response to the transmission request signal, and which is associated with the wheel state, and a transmitter that transmits the wheel state stored on the memory, together with the indication information. According to the second aspect of the present invention, the wheel state together with the indication information as the wheel state information may be transmitted wirelessly and thus the wheel state information including the indication information can be extracted on the vehicle body.

According to the present invention, the determination threshold value set by the setting unit may be obtained from the tire pressure information acquired. In addition, the transmission request signal may be transmitted when the vehicle is stopped.

BRIEF DESCRIPTION OF THE DRAWINGS

The above and other features and advantages of the present invention will become apparent from the following description of example embodiments, given in conjunction with the accompanying drawings, in which.

DETAILED DESCRIPTION OF THE PREFERRED EMBODIMENTS

Figure 1:
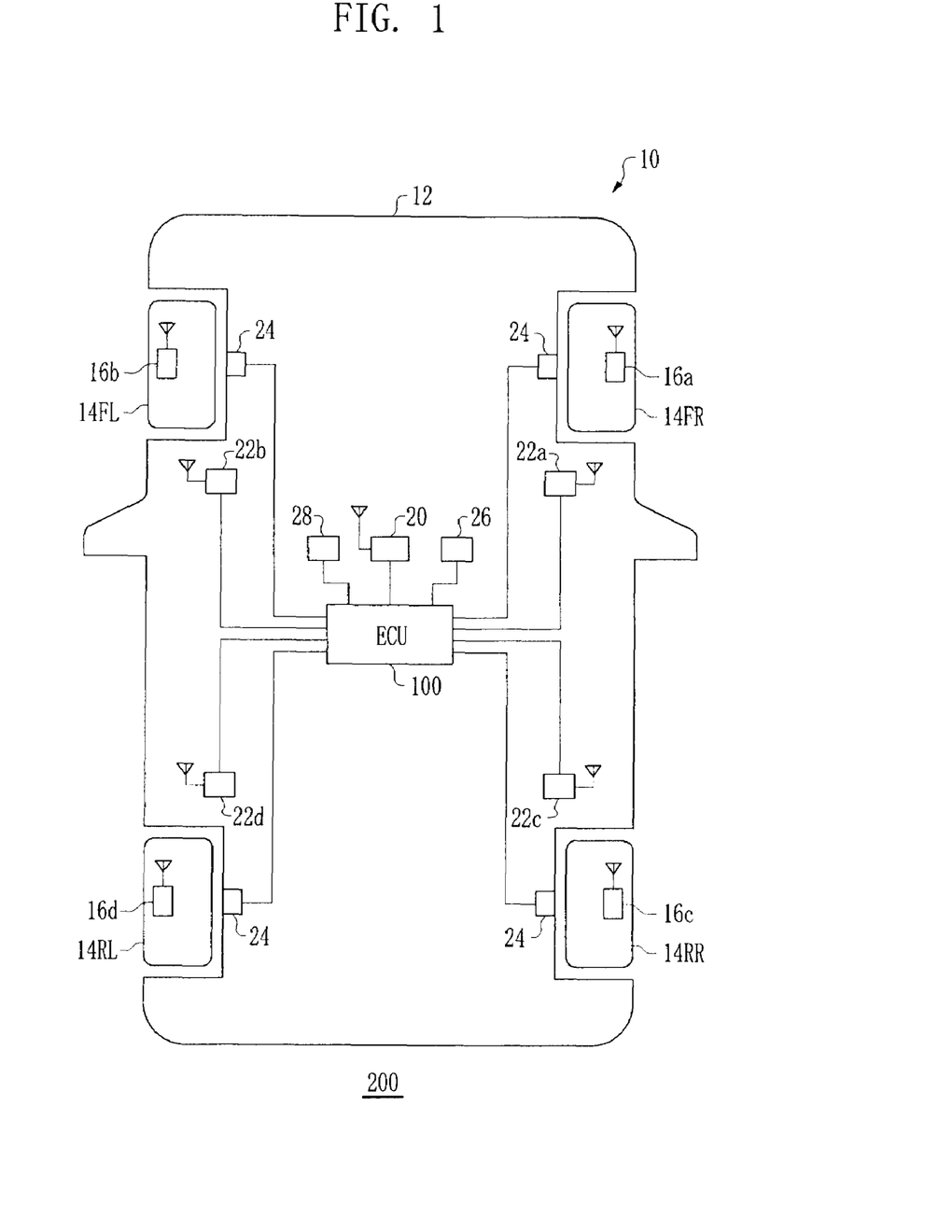
FIG. 1 is a schematic view of a wheel state monitoring system mounted to a vehicle in accordance with an embodiment of the present invention.

FIG. 1 is a schematic view of a wheel state monitoring system 200 mounted to a vehicle 10 in accordance with an embodiment of the present invention. The vehicle 10 is provided with a main body 12, wherein a front right wheel FR, front left wheel FL, rear right wheel RR and rear left wheel RL (hereinafter, referred to as "wheel 14") are mounted to the main body 12. The wheel 14 is provided with a tire and wheel, and a cylindrical wheel rim is provided on the outer circumferential part of the wheel and a tire is mounted on the outer circumference of the wheel rim. A tire air chamber is formed on the space surrounded by the inside of the tire and the outer circumference of the wheel rim.

The wheel state monitoring system 200 according to the present embodiment includes a wheel state detection units 16a, 16b, 16c, and 16d (hereinafter, if necessary, referred to as "wheel state detection unit 16"), vehicle side receiver 20, request signal transmitters 22a, 22b, 22c, and 22d (hereinafter, if necessary, referred to as "request signal transmitter 22"), wheel speed sensor 24 and electromagnetic control unit 100 (hereinafter, referred to as "ECU"). The vehicle state detection units 16a, 16b, 16c, and 16d are mounted on the front right wheel FR, front left wheel FL, rear right wheel RR and rear left wheel RL, respectively. Additionally, the request signal transmitters 22a, 22b, 22c, and 22d are mounted correspondingly to the vehicle state detection units 16a, 16b, 16c, and 16d, respectively.

The wheel state detection unit 16 is provided with a valve stem and a unit main body. The unit main body is provided with a battery and a base on the inside thereof. A process device, which is described later, is mounted on the base. Furthermore, the unit main body is provided with an air pressure sensor, temperature sensor, transmitter, receiver, and the like on the inside thereof. The process device produces wheel state information from the results monitored by the air pressure sensor, the temperature sensor and the like. The battery supplies power to the process device of the base and the like. As a result, the wheel state detection unit 16 detects the tire pressure and the temperature inside the tire air chamber, and wirelessly transmits the detected tire pressure without power supplied from the vehicle body 12. The unit body is fixed to one end of the valve stem. The wheel state detection unit 16 is mounted in the wheel 14 through the valve stem being fixed to the wheel rim. The wheel state detection unit 16 transmits the wheel state information at predetermined intervals, i.e., once per several minutes.

A vehicle side receiver 20, a request signal transmitter 22, a wheel speed sensor 24, an initialization switch 26, a notification unit 28, and an ECU 100 are provided on the vehicle body 12. The ECU 100 monitors tire pressure using the wheel state information transmitted from the wheel state detection unit 16, and when the tire pressure is below a threshold value for triggering an alert regarding tire pressure, the ECU 100 also allows the notification unit 28 to alert a driver. The notification unit 28 may output an audible alarm from a speaker or may output a visual alarm from an image output device such as a liquid crystal panel and the like. In the wheel state monitoring system 200 according to the present embodiment, the ECU 100 sets the threshold value for determining the alarm.

The initialization switch 26 is operated by a driver to set the threshold value for determination an alarm process in case of changing tires newly or exchanging front and rear tires each other. If the tire specification changes, it is necessary to reset the threshold value for determining an alarm process for the new tires for monitoring tire pressure thereof. After changing tires, a driver operates the initialization switch 26 and then the ECU 100 starts the process of setting the determination threshold value.

The request signal transmitter 22 transmits a transmission request signal for the wheel state information to the corresponding wheel state detection unit 16. The request signal transmitter 22 is connected to the ECU 100 and transmits a transmission request signal based on instructions from the ECU 100. The ECU 100 instructs the request signal transmitter 22 to transmit the transmission request signal when the ECU 100 receives the operation input from the initialization switch 26. The receiver of corresponding wheel state detection unit 16 receives the transmission request signal.

When the wheel state detection unit 16 receives the transmission request signal, it transmits the wheel state information, which consists of the detected wheel state and instructions information indicating that the wheel state is detected in response to the transmission request signal. Even though the wheel state detection unit 16 periodically transmits the wheel state information, when it receives the transmission request signal, it will transmit the wheel state information in response to the transmission request signal, regardless of a transmission interval. Further, when the wheel state detection unit 16 receives the transmission request signal, it may transmit the wheel state information at the transmission timing which is reached after receiving the transmission request signal.

The vehicle side receiver 20 receives the wheel state information transmitted from the wheel state detection unit 16. The vehicle side receiver 20 is connected to the ECU 100, and the wheel state information received by the vehicle side receiver 20 is output to the ECU 100. When the received wheel state information is detected in response to the transmission request signal from the request signal transmitter 22, the ECU 100 sets a determination threshold value based on the wheel state information, wherein the determination threshold value is used to determine whether the tire pressure is at a level where the driver should be alerted.

The wheel speed sensor 24 detects the wheel speed, which is the rotational speed of each of the four wheels 14.

Figure 2:
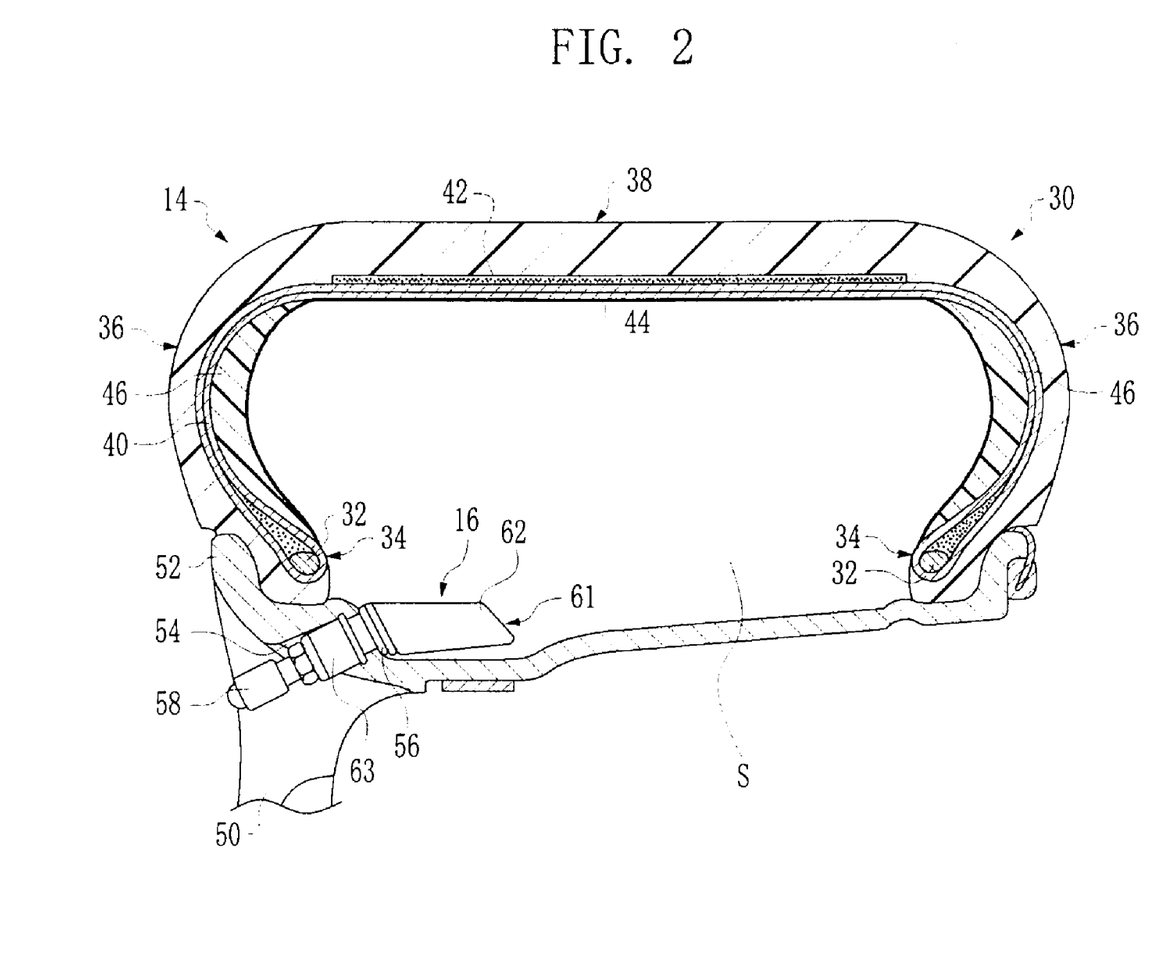
FIG. 2 is a partial sectional view of a wheel installed to the vehicle of FIG. 1.

FIG. 2 is a partial sectional view of the wheel 14 that is mounted on the vehicle 10. A tire 30 included in each wheel 14 is so-called a run flat tire, enabling run flat travel when air pressure decreases. The tire 30 includes a pair of bead parts 34 embedding a bead core 32, a pair of sidewalls 36 extending outwardly in radial direction of the tire from the bead part 34, and a tread portion 38 that extends between both sidewalls 36. A carcass 40 formed of one sheet of fiber material and the like is embedded in the pair of bead parts 34, pair of sidewalls 36 and tread portion 38. A belt layer 42 is embedded in the tread part 38 so that it is arranged in the exterior of the carcass 40. A reinforced rubber layer 46 is embedded on each sidewall 36 so that it is arranged in the interior of an inner liner 44. The reinforced rubber layer 46 is very rigid, and is capable of supporting the whole tire 30 with respect to the wheel 50, enabling the run flat travel when the air pressure inside the tire 30 decreases due to a puncture of the tire and the like.

A wheel state detection unit 16 is mounted in each wheel 14, serving as an air pressure adjustment valve of the tire 30. The wheel state detection unit 16 includes a detection part 61 arranged in the internal space S formed between the tire 30 and the wheel 50; a case 62 formed of resin, which protrudes to the internal space S, that accommodates various sensors that are described later; and an air-passage 63 provided integrally with the case 62. Air is introduced into the internal space S through the air-passage 63 when adjusting air pressure, however, normally, air-passage is sealed with a valve cap 58 mounted on the tip end of the air-passage 63. The wheel state detection unit 16 is mounted through a portion of the air-passage 63 fixed to a mounting hole 54 formed on a wheel rim 52 of the wheel 50 with a grommet 56 made of elastic rubber, a washer and bolt. As a result, the case 62 disposed in the internal space S, is eccentrically supported on the connection part by the air-passage 63. The grommet 56 has a predetermined rigidity and keeps inside of the tire 30 to be airtight. Additionally, the valve cap 58 protrudes outward from the wheel rim 52, and air may be supplied to the inside of the tire 30 by connecting a hose of air supplying device to a valve aperture (not shown) after removing the valve cap 58.

Figure 3:
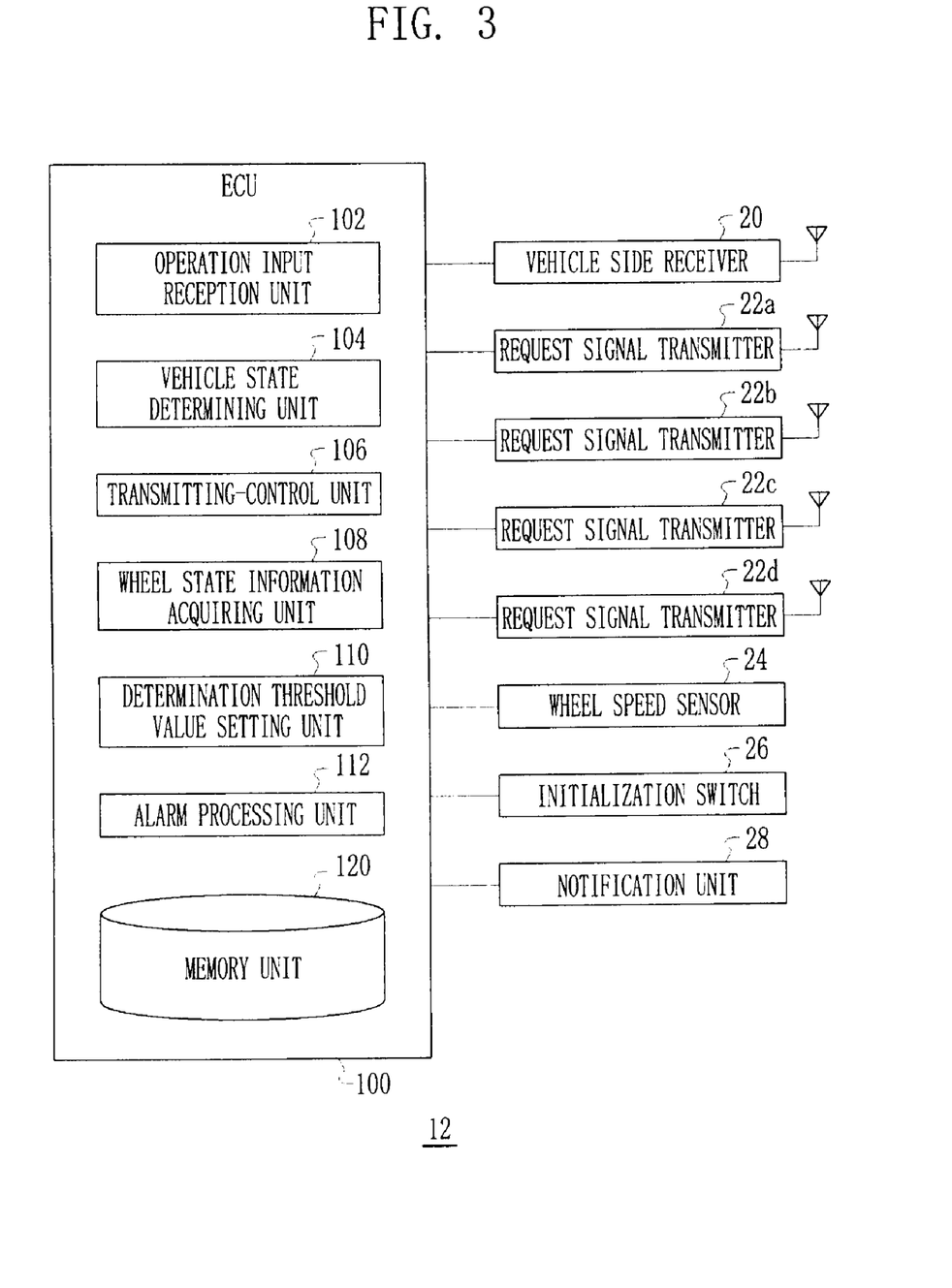
FIG. 3 is a functional block diagram of the vehicle body in the wheel state monitoring system.

FIG. 3 is a functional block diagram of the vehicle body 12 in the wheel state monitoring system 200. The vehicle body 12 includes the vehicle side receiver 20, the request signal transmitter 22, the wheel speed sensor 24, the initialization switch 26, the notification unit 28, and the ECU 100. The ECU 100 includes a operation input reception unit 102, a vehicle state determining unit 104, a transmitting-control unit 106, a wheel state information acquiring unit 108, a determination threshold value setting unit 110, an alarm processing unit 112, and a memory unit 120.

The operation input reception unit 102 receives an input when the driver operates the initialization switch 26. As described above, when the driver operates the initialization switch 26, the ECU starts the process of setting the determination threshold value.

The vehicle state determining unit 104 determines whether the vehicle is in an appropriate state for setting the determination threshold value. In the wheel state monitoring system 200 according to the present embodiment, the determination threshold value is set based on the tire pressure obtained when the transmission request signal is received on the wheel state detection unit 16. Under this condition, when changing tires, a driver operates the initialization switch 26, once the vehicle has stopped, to allow the ECU to begin setting the determination threshold value. While the vehicle is moving, the tire pressure cannot be properly obtained because the temperature inside the tire is increased. Therefore, the vehicle state determining unit 104 determines whether the vehicle is stopped, and ends forcedly the setting of the determination threshold value if the initialization switch 26 is operated while the vehicle is moving. The vehicle state determining unit 104 determines whether the vehicle is moving based on input from the vehicle speed sensor 24.

If the vehicle state determining unit 104 determines that a vehicle state satisfies a predetermined condition, the transmitting-control unit 106 controls each request signal transmitter 22a-22d to transmit the transmission request signal. For example, the transmitting-control unit 106 can control each request signal transmitter 22a-22d to transmit the transmission request signals at a predetermined time interval. For example, the transmitting-control unit 106 may control the request signal transmitters 22a, 22b, 22c, and 22d to transmit the signals at 3-second intervals.

The request signal transmitter 22 is a LF (Low Frequency) transmitter, and may combine a Low Frequency signal with the request signal to transmit them. When the request signal transmitter 22 receives a transmission order from the transmitting-control unit 106, it transmits a transmission request signal to the wheel state detection unit 16.

Figure 4:
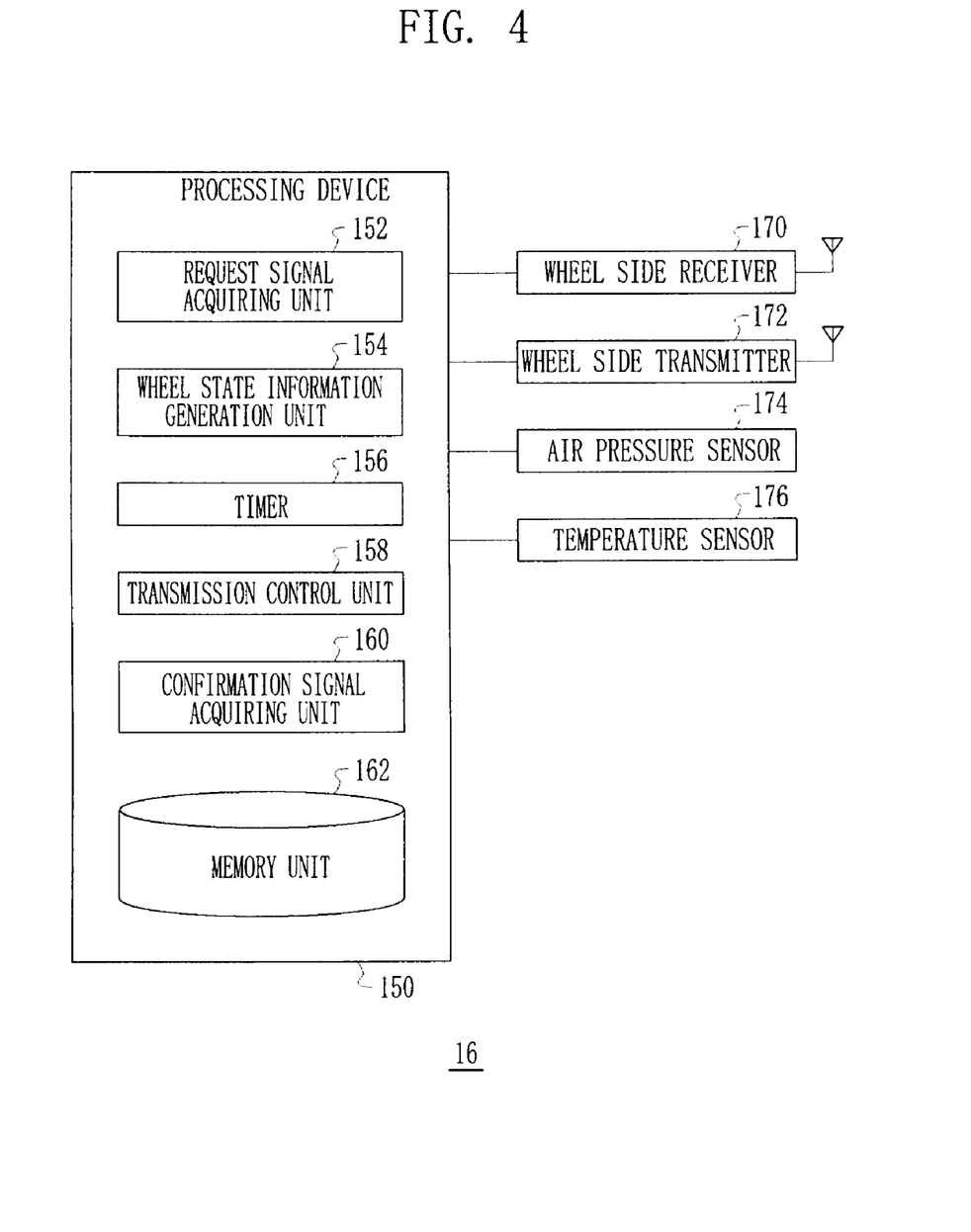
FIG. 4 is a functional block diagram of the wheel state detection unit in accordance with an embodiment of the present invention.

FIG. 4 is a functional block diagram of the wheel state detection unit 16 in accordance with an embodiment of the present invention. The wheel state detection unit 16 includes a wheel side receiver 170, a wheel side transmitter, an air pressure sensor 174, a temperature sensor 176, and a processing device 150.

The air pressure sensor 174 and the temperature sensor 176 are detection means for detecting the wheel state, respectively. The air pressure sensor 174 detects the air pressure in an air chamber of the tire (hereinafter, referred to as "tire pressure"), and the temperature sensor 176 detects the temperature in the air chamber of the tire. The air pressure sensor 174 and the temperature sensor 176 are connected to the processing device 150 and the detected results by the air pressure sensor 174 and the temperature sensor 176 are output to the processing device 150. The wheel side transmitter 172 transmits the wheel state information to the vehicle side receiver 20, and the wheel side receiver 170 receives a transmission request signal transmitted from the request signal transmitter 22.

The processing device 150 includes a microprocessor as well as a request signal acquiring unit 152, a wheel state information generation unit 154, a timer 156, a transmission control unit 158, a confirmation signal acquiring unit 160, and a memory unit 162. The timer 156 measures time. The memory unit 162 stores a unit ID used as identification information to identify a particular wheel state detection unit 16. The wheel state information generation unit 154 acquires the information of the tire pressure and temperature inside the tire air chamber (hereinafter, referred as "tire pressure information") by using the detected results from the air pressure sensor 174 and the temperature sensor 176. The wheel state information generation unit 154 generates wheel state information that contains the detected tire pressure information and the like. The wheel state information includes the unit ID and is stored in the memory unit 162 before being transmitted from the wheel side transmitter 172 pursuant to the transmission instructions from the transmission control unit 158. The wheel state information generation unit 154 generates the wheel state information at a predetermined intervals governed by the timer 156, and the wheel state information is transmitted at predetermined intervals from the wheel side transmitter 172 by the transmission control unit 158.

The processing device 150 according to the present embodiment may also periodically generate and transmit the wheel state information as well as then transmitting forcedly the wheel state information detected by the air pressure sensor 174 and the temperature sensor 176 in response to the transmission request signal from the vehicle body 12.

Specifically, when the wheel side receiver 170 receives the transmission request signal from the request signal transmitter 22, the request signal acquiring unit 152 acquires the transmission request signal. The request signal acquiring unit 152 orders the wheel state information generation unit 154 to generate the wheel state information for setting the determination threshold value. The wheel state information generation unit 154 receives the detected results from the air pressure sensor 174 and temperature sensor 176, and generates the wheel state information including the tire pressure information and the like, together with the instructions information indicating that the wheel state is detected in response to the transmission request signal. For example, the indication information may be expressed with a flag value. The data format of the wheel state information is provided with a response flag, and the response flag value of typically periodically transmitted wheel state information is set to be 0, and the response flag value of the wheel state information generated in response to the transmission request signal from the vehicle body 12 is to set be 1. As a result, the wheel state information used in the setting process of the determination threshold value can be selectively acquired on the vehicle body 12 side, by referring to the response flag value of the wheel state information.

Meanwhile, when the wheel state information generation unit 154 receives the instructions from the request signal acquiring unit 152, it generates the wheel state information at the timing when the instructions are received, or when at specified time intervals. In the former case, the wheel state information is generated differently from a generation interval, and in the latter case, the wheel state information is generated to meet a typical generation interval. Further, in the former case, once the wheel state information generation unit 154 generates the wheel state information, it then notifies the transmission control unit 158 that the wheel state information has been generated. The transmission control unit 158 allows the wheel side transmitter 172 to transmit the generated wheel state information to the vehicle side receiver 20. As a result, the vehicle side receiver 20 receives the wheel state information that is used to set the determination threshold at comparatively fast timing after the transmission request signal is transmitted from the transmission request transmitter 22. Additionally, the transmission control unit 158 may allow the wheel side transmitter 22 to transmit the wheel state information to the vehicle side receiver 20 at the transmission timing at predetermined transmission intervals. The wheels state information generation unit 154 stores the wheel state information of the transmission request signal on the memory unit 162.

Referring to FIG. 3, the vehicle side receiver 20 receives the wheel state information transmitted from the wheel side transmitter 172 and transfers it to the wheel state information acquiring unit 108. When acquiring the wheel state information, the wheel state information acquiring unit 108 determines whether it is to be used in the setting the determination threshold value by referring to the response flag value. As described above, if the response flag value is set to be 1, it is determined that the wheel state information is to be used in setting the determination threshold value. When the response flag value is 1, the wheel state information acquiring unit 108 transfers the wheel state information to the determination threshold value setting unit 110. The determination threshold value setting unit 110 sets the threshold value for determining based on the tire pressure included in the wheel state information.

For example, the determination threshold value setting unit 110 may, for example, multiply the value of the detected tire pressure information by 0.75 and set the result as the determination threshold value. Accordingly, if the detected tire pressure information is 200 kPa, 150 kPa (=200 KPa×0.75) is set as the determination threshold value. The coefficient may be any suitable value, here the coefficient of 0.75 means that an alert is provided when the tire pressure has decreased by about 25% from the initial state.

As well, the determination threshold value setting unit 110 sets the threshold value for determining when the wheel state information from the wheel state information acquiring unit 108 satisfies a predetermined condition, and if not, it does not perform the determination threshold value setting process. For example, if the detected tire pressure information is abnormally high or low, the threshold value should not be set based on the detected tire pressure. Therefore, when setting the upper limit and lower limit, if the detected tire pressure information is not within the specified range between the upper limit and lower limit, the determination threshold value setting unit 110 does not perform the determination threshold value setting process. As a result, it is possible to avoid setting an inappropriate determination threshold value.

The memory unit 120 stores the corresponding table between the unit ID of the wheel state detection unit 16 and the mounting locations of the wheel state detection unit 16. When new tires are mounted or the wheel positions exchanged, the corresponding table may be made by a driver. The determination-threshold value setting unit 110 sets the determination threshold value for each wheel by using the corresponding table and the unit ID included in the wheel state information.

Also, the request signal transmitter 22 is provided with a transmitter ID and thus can make the corresponding table between the unit ID of the wheel state detection unit 16 and the mounting location of the wheel state detection unit 16. The determination threshold value setting unit 100 stores the corresponding table between the transmitter ID of the request signal transmitter 22a-22d and the mounting location thereof.

Each request signal transmitter 22 transmits a transmission request signal including its transmitter ID. In the wheel state detection unit 16, when the request signal acquiring unit 152 acquires the transmission request signal, the information of the transmitter ID is sent to the wheel state information generation unit 154. As a result, the wheel state information generation unit 154 generates the wheel state information which also includes the information of the transmitter ID. As described above, the wheel state information is transmitted from the wheel side transmitter 172 to the vehicle side receiver 20 by the transmission control unit 158.

The wheel state information acquiring unit 108 acquires the wheel state information and the determination threshold value setting unit 110 acquires the transmitter ID included in the wheel state information. Therefore, the determination threshold value setting unit 110 specifies the wheel state information transmitted from which wheel state detection unit 16 of the front right wheel FR, front left wheel FL, rear right wheel RR and rear left wheel RL, by referring to the corresponding table of the transmitter ID and the mounting location thereof. Accordingly, the determination threshold value setting unit 110 may make the corresponding table of the unit ID of the wheel state detection unit 16 and the mounting location of the wheel state detection unit 16, and sets the determination threshold value for each wheel.

When the determination threshold value is set as described above, the alarm processing unit 112 determines whether the wheel state information transmitted periodically from the respective wheel state detection unit 16 is below the threshold value for triggering the low pressure alert. In addition, because the temperature inside the tire air chamber increases while the vehicle is in motion, it is preferable to determine tire pressure taking into account the effect of the increased temperature, for example, to determine tire pressure more frequently. When the tire pressure is determined to be below the determination threshold value, the alarm processing unit 112 allows the notification unit 28 to issue an alert. The notification unit 28 may audibly alert the driver from a speaker that the tire pressure has decreased, or may visually alert the driver through an image output device, such as a liquid crystal panel and the like.

Furthermore, in the present embodiment, the process of setting the threshold value starts once the vehicle is stopped. A communication state between the wheel side transmitter 172 of the wheel state detection unit 16 and the vehicle side receiver 20 of the vehicle body 12 is influenced significantly by the orientation of the wheel when the vehicle is stopped. As shown in FIG. 2, because the wheel state detection unit 16 is mounted on the valve stem, situations may occur where the transmission signal from the wheel side transmitter 172 cannot be received by the vehicle side receiver 20, depending on the orientation of the wheel when the vehicle is stopped.

Therefore, in the wheel state detection unit 16, the wheel state information is stored in the memory unit 162 until it is confirmed that the wheel state information in response to the transmission request signal can be received by the vehicle body 12. In the vehicle body 12, when the wheel state information acquiring unit 108 acquires the wheel state information in which the response flag value of 1 is set, a reception confirmation signal (so-called ACK signal) is transmitted from the request signal transmitter 22. When the confirmation signal acquiring unit 160 acquires this reception confirmation signal, it is confirmed that the wheel state information is received properly in the vehicle body 12 and the wheel state information stored in the memory unit 162 is deleted.

Meanwhile, when the confirmation signal acquiring unit 160 does not acquire the reception confirmation signal, it notifies to the transmission control unit 158 that the confirmation signal acquiring unit 160 does not acquire the reception confirmation signal. For example, if the confirmation signal acquiring unit 160 does not acquire the reception confirmation signal until a predetermined time period, measured by the timer 156, has elapsed after the wheel state information is transmitted from the wheel side transmitter 172, it may notify to the transmission control unit 158 that the confirmation signal acquiring unit 160 does not acquire the reception confirmation signal. When receiving this notice, the transmission control unit 158 may allow the wheel side transmitter 172 to retransmit the wheel state information stored in the memory unit 162.

Moreover, because the location of the wheel state detection unit 16 does not change once the vehicle is stopped, it is determined that the communication circumstances between the wheel side transmitter 172 and vehicle side receiver 20 will not improve. Accordingly, the retransmission process by the transmission control unit 158 is performed within a predetermined period of time. Thus, an unnecessary repetition of retransmission process can be avoided and the drain on the battery may be reduced. In addition, if the wheel state detection unit 16 is mounted with an acceleration sensor and detects that the wheel 14 is rotating the retransmission process may be performed or restarted when the wheel 14 begins rotating. As a result, even if the vehicle is moving, the vehicle receiver 20 properly receives the wheel state information at the moment that the initialization switch 26 is operated.

Figure 5:
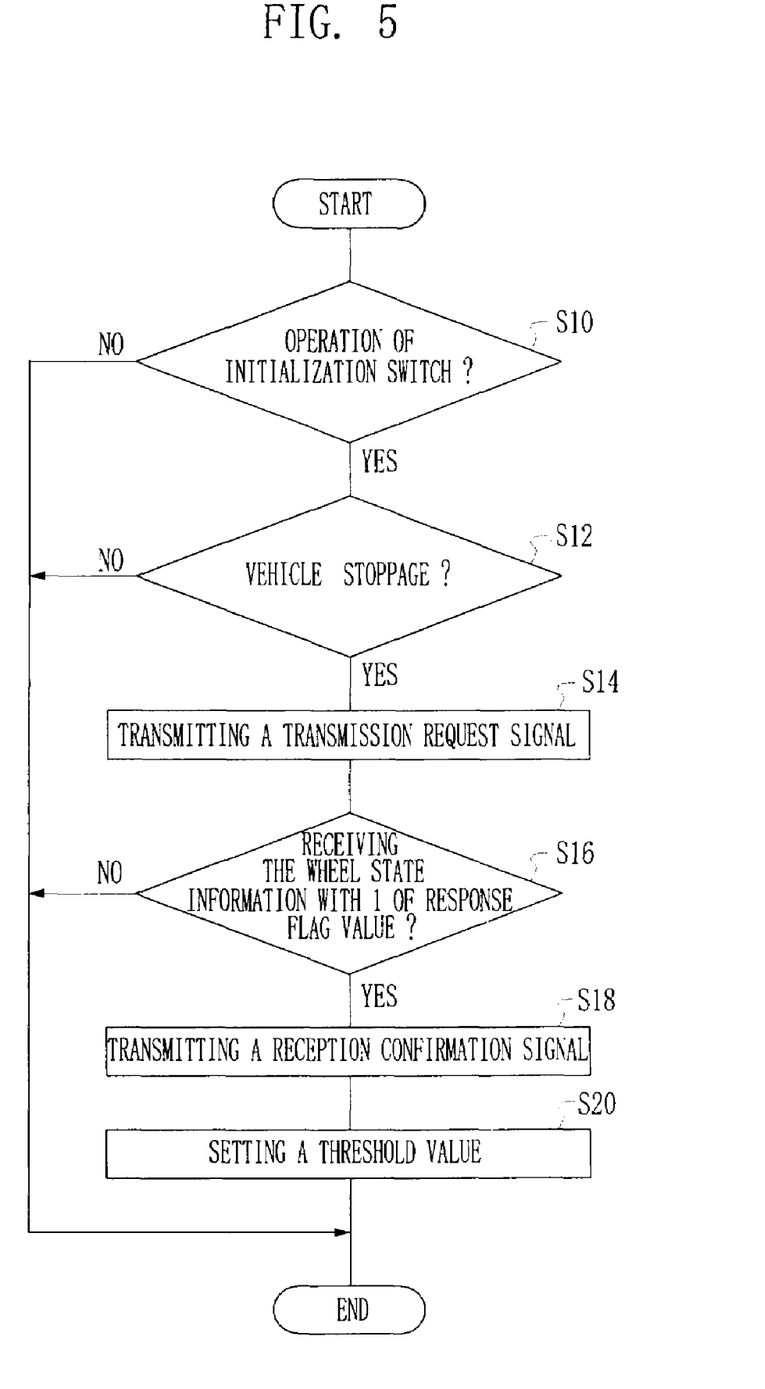
FIG. 5 is a view showing a flow of setting processes of a determination threshold value, which is executed in the vehicle body.

FIG. 5 is a flowchart that shows the process of setting the determination threshold value, which is performed in the vehicle body 12. The process starts with a operation of the initialization switch 26 by a driver (Y at S10). If the initialization switch 26 is not operated (N at S10), the process is not initiated.

When the initialization switch 26 is operated, the vehicle-state determining unit 104 determines whether the vehicle is stopped (S12). If the vehicle is not stopped (N at S120), the setting process of the determination threshold value ends. If the vehicle is stopped (Y at S12), the transmitting control unit 106 controls each request signal transmitter 22 to transmit the transmission request signal (S14). When the wheel-state information acquiring unit 108 acquires the wheel state information in response to the transmission request signal (Y at S16), the reception confirmation signal is transmitted from the request signal transmitter 22 (S18). Moreover, when the wheel-state information acquiring unit 108 does not acquire the wheel state information in response to the transmission request signal, for example for predetermined time period (N at S16), the setting determination threshold value may be terminated. The determination threshold setting unit 110 sets the threshold value of alarm process for determining, based on the tire pressure information included in the wheel state information (S20).

Figure 6:
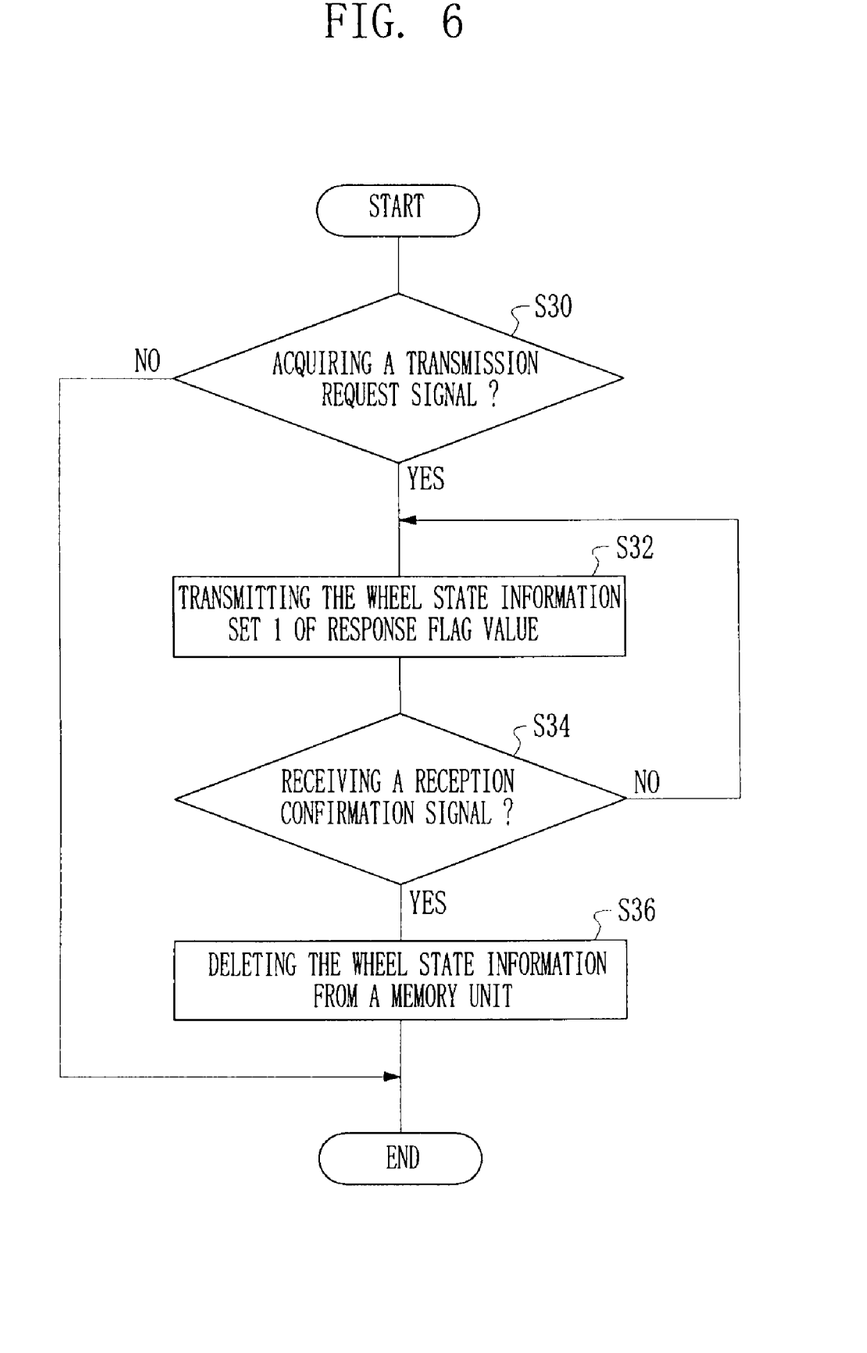
FIG. 6 is a view showing a flow of transmission processes of the wheel state information, which is executed in the wheel state detection unit.

FIG. 6 is a view showing the transmission processes of the wheel state information that are performed in the wheel state detection unit 16. The process starts when the request signal acquiring unit 152 acquires the transmission request signal (Y at S30). If no transmission request signal is acquired (N at S30), the process is not executed. Although the transmission process of the wheel state information used in setting the determination threshold value is shown, the transmission process of the periodic wheel state information is omitted.

The wheel state information generation unit 154 generates the wheel state information includes the wheel state and instructions information which indicates that the wheel state is detected by the air pressure sensor in response to the transmission request signal, and which is associated with the wheel state, and stores the wheel state with the instructions information on the memory unit 162. The wheel side transmitter 172 transmits the wheel state information to the vehicle side receiver 20 (S32). The wheel side transmitter 172 may transmit the wheel state information at the timing of generating it or at predetermined interval.

The confirmation signal acquiring unit 160 confirms whether the reception confirmation signal is transmitted from the request signal transmitter 22, and if it is not confirmed (N at S34), the wheel state information stored on the memory unit 162 is retransmitted (S32). When the confirmation signal acquiring unit 160 acquires the reception confirmation signal (Y at S34), the wheel state information is deleted from the memory unit 162.

While the invention has been shown and described with respect to the example embodiments, it will be understood by those skilled in the art that various changes and modification may be made without departing from the spirit and scope of the invention as defined in the following claims.

What is claimed is:

1. A wheel state monitoring system, for a vehicle body that includes a plurality of wheels, the wheel state monitoring system comprising:
   a plurality of wheel state detection units, wherein each wheel state detection unit is mounted to a corresponding wheel, each wheel state detection unit detects a wheel state for the corresponding wheel and each wheel state detection unit transmits wheel state information that indicates the wheel state;
   a transmitter, mounted on the vehicle body, that transmits a request signal that requests the wheel state information; and
   a receiver, mounted on the vehicle body, that receives the wheel state information transmitted from each wheel state detection unit,
   wherein, when each wheel state detection unit receives the request signal, each wheel state detection unit transmits the wheel state information, together with instructions information which indicates that the wheel state is detected by each wheel state detection unit, at a moment when each wheel state detection unit initially receives the request signal from the transmitter mounted on the vehicle body, and
   wherein each respective wheel state detection unit stores the wheel state information generated in response to the request signal in a memory until the respective wheel state detection unit receives a confirmation signal from the vehicle body that the wheel state information has been received by the receiver mounted on the vehicle body.

2. A wheel state monitoring system according to claim 1, further comprising:
   a setting unit, provided on the vehicle body, that sets a threshold value used for triggering an alert regarding a tire pressure based on the wheel state information transmitted from the wheel state detection unit.

3. A wheel state monitoring system according to claim 2, wherein the transmitter transmits the request signal in response to a driver input, and the setting unit sets the threshold value when the wheel state satisfies a predetermined condition.

4. A wheel state monitoring system according to claim 1, wherein the transmitter transmits the request signal in response to a driver input made when the wheel state satisfies a predetermined condition.

5. A wheel state monitoring system according to claim 4, wherein the transmitter transmits the request signal when the vehicle is stopped.

6. A wheel state monitoring system according to claim 1, wherein the wheel state detection unit periodically transmits the wheel state information.

7. A wheel state monitoring system according to claim 1, wherein the wheel state detection unit receives the confirmation signal from the transmitter mounted on the vehicle body.

8. A wheel state monitoring system according to claim 1, wherein the wheel state is a tire pressure.

9. A wheel state detection apparatus according to claim 1, wherein each wheel state detection unit includes an acceleration sensor,
   wherein each wheel state detection unit transmits the wheel state information based on an acceleration amount detected by the acceleration sensor.

10. A wheel state detection apparatus according to claim 9, wherein each wheel state detection unit transmits the wheel state for a predetermined period of time when the vehicle is stopped, each wheel state detection unit then stops transmitting the wheel state, and then each wheel state detection unit retransmits the wheel state when the acceleration sensor detects that the vehicle begins to move.

11. A wheel state detection apparatus comprising:
   a detector that detects a wheel state;
   a receiver that receives a transmission request signal;
   a memory that stores the wheel state detected by the detector when the receiver receives the transmission request signal, with an instructions information that indicates that the wheel state is detected in response to the transmission request signal, wherein the wheel state is associated with the instructions information; and
   a transmitter that transmits the wheel state stored in the memory, together with the instructions information,
   wherein the detection apparatus deletes the wheel state from the memory when the receiver receives a confirmation signal that the wheel state transmitted by the transmitter has been received.

12. A wheel state detection apparatus according to claim 11, wherein the transmitter periodically transmits the wheel state information.

13. A wheel state detection apparatus according to claim 11, wherein the wheel state is a tire pressure.

14. A wheel state detection apparatus according to claim 11, further comprising an acceleration sensor,
   wherein the transmitter transmits the wheel state based on an acceleration amount detected by the acceleration sensor.

15. A wheel state detection apparatus according to claim 14, wherein the wheel state detector is mounted on a wheel of a vehicle, and wherein the transmitter transmits the wheel state for a predetermined period of time when the vehicle is stopped, the transmitter then stops transmitting the wheel state, and then the transmitter retransmits the wheel state when the acceleration sensor detects that the vehicle begins to move.

16. A wheel state monitoring method for a wheel state monitoring system, provided in a vehicle body including a plurality of wheels, that includes a plurality of wheel state detection units, each mounted on a corresponding wheel, and each transmits wheel state information; a transmitter, mounted on a vehicle body, that transmits a request signal for the wheel state information; and a receiver, mounted on the vehicle body, that receives the wheel state information transmitted from the wheel state detection units, the method comprising:
   transmitting the wheel state, together with instructions information that indicates that the wheel state is detected by each wheel state detection unit at a moment when each wheel state detection unit receives the request signal;
   storing the wheel state information generated in response to the request signal in a memory of each respective wheel state detection unit until the respective wheel state detection unit receives a confirmation signal from the vehicle body that the wheel state information has been received by the receiver mounted on the vehicle body; and
   deleting the wheel state information from the memory of the respective wheel state detection unit once the confirmation signal is received by the respective wheel state detection unit.

* * * * *